United States Patent
Shi et al.

(10) Patent No.: US 9,614,280 B2
(45) Date of Patent: Apr. 4, 2017

(54) OPTICAL FEED NETWORK FOR PHASED ARRAY ANTENNAS

(71) Applicant: Phase Sensitive Innovations, Inc, Newark, DE (US)

(72) Inventors: Shouyuan Shi, Newark, DE (US); Jian Bai, Newark, DE (US); Dennis W. Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 620 days.

(21) Appl. No.: 13/905,895

(22) Filed: May 30, 2013

(65) Prior Publication Data
US 2015/0303986 A1    Oct. 22, 2015

(51) Int. Cl.
*H01Q 3/26* (2006.01)
*H01Q 3/34* (2006.01)
*H04B 10/2575* (2013.01)
*H04B 10/532* (2013.01)

(52) U.S. Cl.
CPC ......... *H01Q 3/2676* (2013.01); *H01Q 3/2682* (2013.01); *H01Q 3/34* (2013.01); *H04B 10/25758* (2013.01); *H04B 10/532* (2013.01); *H04B 2210/006* (2013.01)

(58) Field of Classification Search
CPC ....... H01Q 3/2676; H01Q 3/2682; H01Q 3/34
See application file for complete search history.

(56) References Cited

U.S. PATENT DOCUMENTS

| | | | | |
|---|---|---|---|---|
| 4,084,880 A | * | 4/1978 | Clow | G06E 3/001 359/107 |
| 4,669,085 A | * | 5/1987 | Plourde | G02F 1/0327 372/12 |
| 4,739,334 A | * | 4/1988 | Soref | H01Q 3/2676 342/200 |
| 5,841,489 A | * | 11/1998 | Yoshida | G02F 1/135 349/17 |
| 2002/0181874 A1 | * | 12/2002 | Tulchinsky | H01Q 3/2676 385/39 |
| 2004/0076364 A1 | * | 4/2004 | Maki et al. | 385/16 |
| 2007/0248229 A1 | * | 10/2007 | Kawamoto | H04B 10/70 380/256 |
| 2008/0050126 A1 | * | 2/2008 | Shapiro | H04Q 11/0005 398/212 |
| 2011/0157686 A1 | * | 6/2011 | Huber | A61B 5/0059 359/333 |
| 2011/0220815 A1 | * | 9/2011 | Sakuma | G02F 1/0136 250/504 R |
| 2013/0162987 A1 | * | 6/2013 | Mori | H01S 3/302 356/301 |

OTHER PUBLICATIONS

Feng Xiao; Juswardy, B.; Alameh, K.; Shilin Xiao; Hu, W., "Opto-VLSI-Based Beamformer for Radio-Frequency Phased-Array Antennas," Photonics Journal, IEEE , vol. 4, No. 3, pp. 912,919, Jun. 2012.*

(Continued)

*Primary Examiner* — Michelle M Koeth
(74) *Attorney, Agent, or Firm* — Panitch Schwarze Belisario & Nadel LLP

(57) ABSTRACT

An optical feed network for a phased-array antenna may comprise a phase-based feed network that may include electro-optical phase shifting.

20 Claims, 4 Drawing Sheets

(56) References Cited

OTHER PUBLICATIONS

Byung-Min Jung; Yao, J., "A Two-Dimensional Optical True Time-Delay Beamformer Consisting of a Fiber Bragg Grating Prism and Switch-Based Fiber-Optic Delay Lines," Photonics Technology Letters, IEEE , vol. 21, No. 10, pp. 627,629, May 15, 2009.*
Feng Xiao; Juswardy, B.; Alameh, K.; Shilin Xiao; Hu, W., "Opto-VLSI-Based Beamformer for Radio-Frequency Phased-Array Antennas," Photonics Journal, IEEE, vol. 4, No. 3, pp. 912,919, Jun. 2012.*
Byung-Min Jung; Yao, J., "A Two-Dimensional Optical True Time-Delay Beamformer Consisting of a Fiber Bragg Grating Prism and Switch-Based Fiber-Optic Delay Lines," Photonics Technology Letters, I EEE, vol. 21, No. 10, pp. 627,629, May 15, 2009.*
G.J. Schneider et al., "Optical Generation of Narrow-line RF by Injection Locking of Modulated DFB Lasers," IEEE CLEO Conference, 2011.

\* cited by examiner

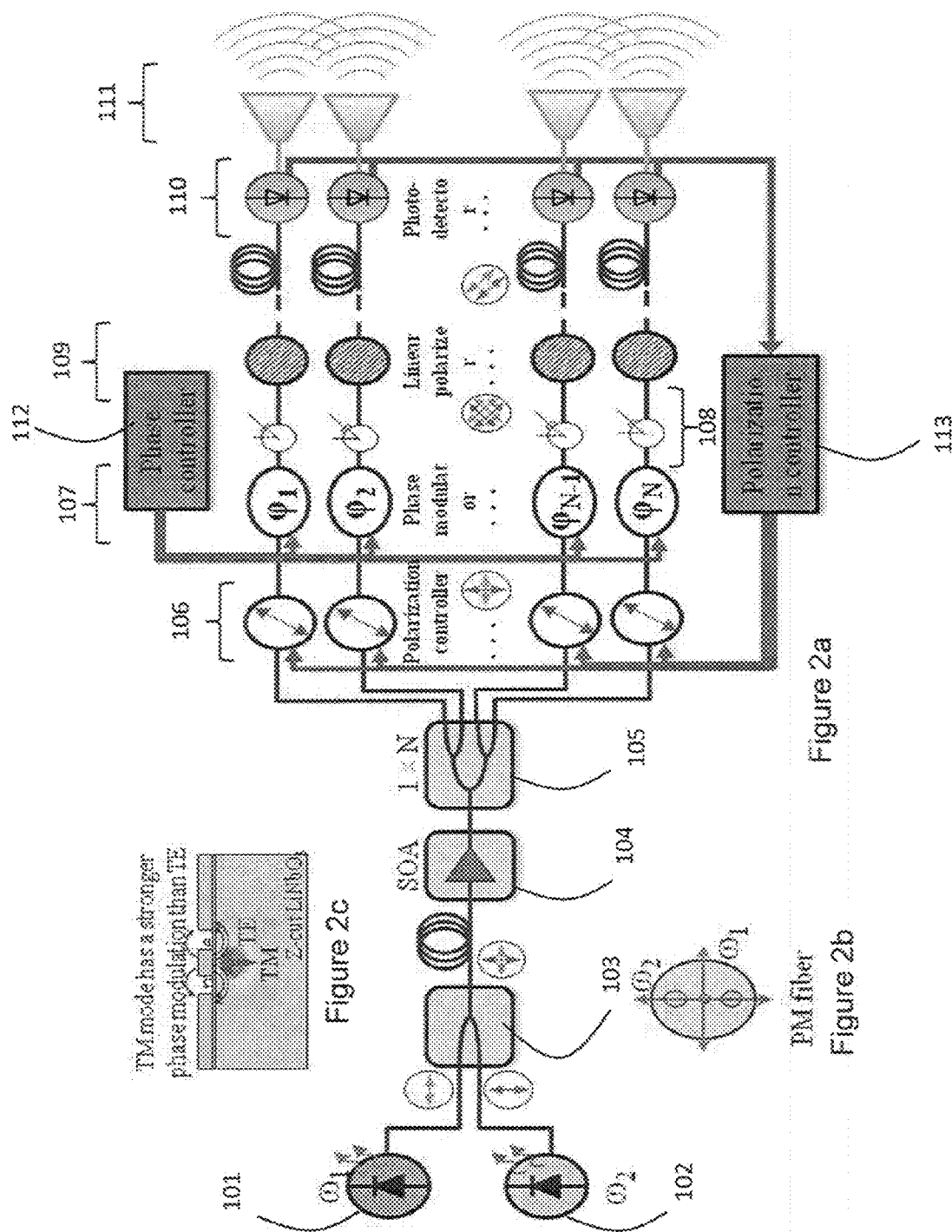

OPTICAL FEED NETWORK FOR PHASED ARRAY ANTENNAS

FIELD OF THE INVENTION

Embodiments of the invention may relate to feed networks for phased array antennas, particularly optical feed networks.

BACKGROUND

Success in the development of high-quality and ultra-wideband radio frequency (RF) sources has led to the exploration of applications of such technology, such as ultra-wideband phased-antenna arrays. An example of this may be found in G. J. Schneider et al., "Optical Generation of Narrow-Line RF by Injection Locking of Modulated DFB Lasers" *CLEO Conference,* 2011, incorporated herein by reference. In a proposed approach of this paper, two laser outputs having a frequency difference corresponding to a frequency of an RF signal may be fed into an optical interleaving and feeding network consisting of two 1-to-N beam splitters, N electro-optic phase modulators, N2-to-1 beam combiners and fiber couplers. The beam splitting, phasing, and recombining can be achieved through typical fiber-based components.

The proposed approach, however, imposes some technical difficulties in the practical implementation. Due to thermal and mechanical stresses in each channel, the relative phases between channels may drift over time, thereby resulting in significant distortion in RF beamforming.

BRIEF SUMMARY OF EMBODIMENTS OF THE INVENTION

Various embodiments of the present invention may address the above-noted phase-drift issues. In particular, various embodiments of the invention may present an optical feed network for phased array antennas by providing a phased-based feed network.

BRIEF DESCRIPTION OF THE DRAWINGS

Various embodiments of the invention will now be described in conjunction with the accompanying drawings, in which:

FIG. 2a shows a detailed block diagram of an embodiment, of the invention;

FIGS. 2b and 2c show conceptual diagrams of details that may be found in the block FIG. 2a, in some embodiments of the invention.

DETAILED DESCRIPTION OF EMBODIMENTS OF THE INVENTION

Various embodiments of the invention may include an optically addressed phase-based feed network for, for example, an ultra-wideband RF phased array that may include techniques designed to compensate the phase fluctuations induced in optical fibers, e.g., due to thermal and mechanical stresses. One may use polarization maintaining (PM) fibers to encode two coherent optical tones in two orthogonal states and to transmit them to a high-speed photomixer at the antenna head for RF signal transmission. Co-propagation in the same fiber may enable two optical signals to experience the same environmental impact, thereby significantly minimizing phase fluctuations. To phase the antenna array, a phase-shifting element may be used, which may, e.g., comprise an electro-optic phase shifter and true time delay line (which may be optically-based), in which phase shift may be dominated at one of the polarizations, consequently leading to an electrically addressed phase shift at the mixer. The electro-optic phase shifter may be implemented in the form of an electro-optic modulator. The combination of an electro-optic modulator and true time delay line may serve, to provide both narrow and ultra-wide band instantaneous bandwidth, which may be applicable, e.g., to phased-array radars, multi-beamforming, multi-in-multi-out (MIMO) systems, and/or communication systems. In addition, dynamic polarization control may also be used to compensate for polarization fluctuation that may be induced, e.g., by bending, thermal, and mechanical stresses.

Figure 1:
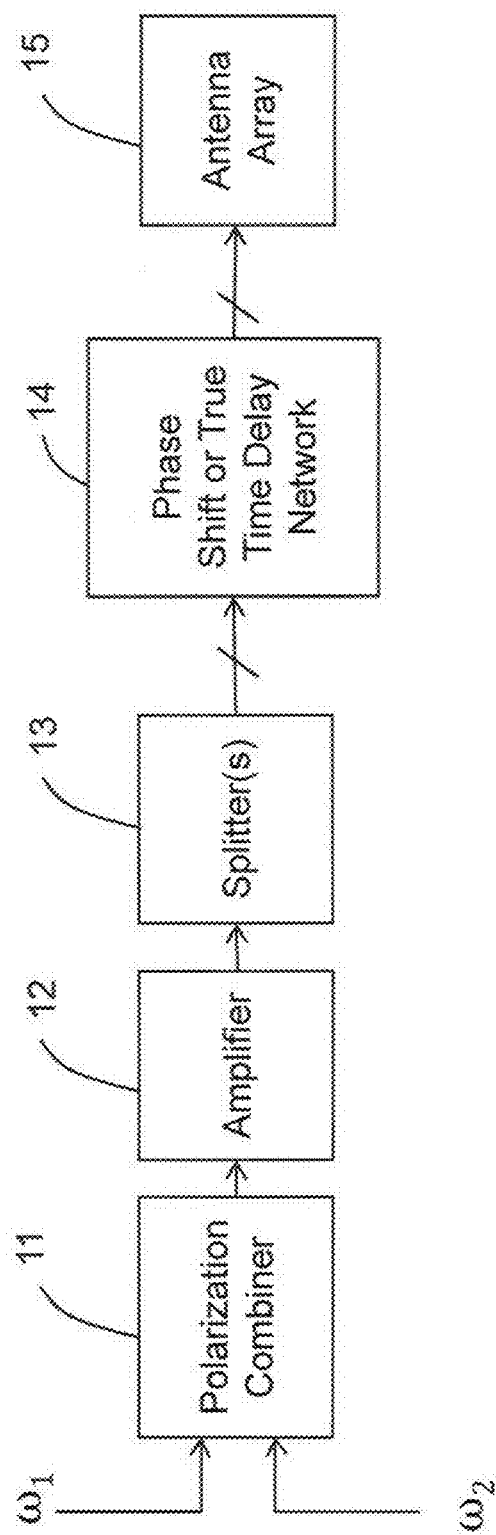
FIG. 1 shows a simplified block, diagram of an embodiment of the invention.

FIG. 1 shows a block diagram of a feed network according to an embodiment of the invention. Optical signals, labeled $\omega_1$ and $\omega_2$, may be fed into a polarization combiner 11. The optical signals may be generated by coherent optical sources and may be polarized, e.g., horizontally and vertically, respectively, although the invention is not thus limited. The combined output of polarization combiner 11 may be fed, e.g., through a PM fiber, to one or more amplifiers 12. The amplified output may be provided to one or more splitters 13, which may output multiple optical signals that may be used to generate signals to be fed to an antenna array 15, via phase network 14, which may include phase shifting (which may, e.g., by implemented by means of a phase modulator) and/or true time delay components, as discussed, above.

FIG. 2a shows a more-detailed example of a phase-based feed network, which may be similar to that shown in FIG. 1, according to an embodiment of the invention. Two coherent optical sources 101, 102 may provide optical signals labeled as $\omega_1$ and $\omega_2$. The optical signals may be combined using a polarization combiner 103 into the fast and slow axes of a PM fiber, as shown in FIG. 2b. The PM fiber may feed the signals into a polarization independent power amplifier 104, which may amplify them simultaneously. The resulting amplified signal may then be split into N channels with beam splitters 105, to produce signals that may undergo further processing, and which may eventually be delivered to antenna heads 111 for RF generation and transmission. Beam splitters 105 may include, for example, 1-to-2 and/or 1-to-N beam splitters; but the invention is not necessarily limited to these types of beam splitters. As a result of the initial processing in blocks 103, 104, and 105, phase fluctuations that occur before the polarization combiner 103 on the two optical tones may be equally distributed to each channel, and as a result, the produced RF signal after photo-mixing may be independent of induced phase noise. Also, due to the co-propagation of both optical signals in the same fiber, after the polarization combiner 103, they may generally experience the same phase fluctuations, which may thus result in reduction of relative phase fluctuations between the signals.

Following splitters 105, the respective channels may be fed into a phase-shifting block, which may, e.g., be implemented by an electro-optical (EO) phase modulation (PM) and/or true time delay line feed network, shown as block 14 in FIG. 1, and which may be used to tune the phase for beam scanning. The EO-PM network may include phase modulators 107. Phase modulators 107 may be used to phase modulate the transverse magnetic (TM) and transverse electric (TE) modes separately, where the TM mode may be phase modulated and the TE mode may have less modulation than the TM mode. An example is shown in FIG. 2c. Phase modulators 107 may be controlled by a phase controller 112. In addition to EO-PM, phase modulation may be achieved using a true time delay line (instead of or in combination with EO-PM or other phase-shifting), in which a large time delay may be used, e.g., in ultra-wide band applications. Phases of the phase modulators 107 and/or true time delay line may be controlled to provide, for example, beamforming, sweeping, scanning, and/or other functions; but the invention is not thus limited. After the phase modulation of $\omega_2$, both signals may be projected to the fast and slow axes by applying a 45° rotational key 108. The two sets of orthogonal signals may then be filtered by linear polarizers 109 before being delivered to photodetectors 110, which may provide respective feed signals to antenna heads 111. An additional role of photodetectors 110 will be discussed further below.

Many optical components, such as the polarization combiner 105 and EO phase modulators 107, may be polarization sensitive. The state of polarization in the PM fiber may be altered as the light propagates along the fiber due to a variety of reasons, such as alignment mismatch in the fiber connectors, birefringence due to thermal, and mechanical stress, and/or integration and fabrication defects in each component. Furthermore, if polarization states are not preserved, amplitude modulation may be introduced into the system due to coupling of the optical signals into both TE and TM polarizations of the EO phase modulators 107. Polarization management may, therefore, be needed to precisely control the state of polarization of the two optical signals. This may be done, for example, by means of a polarization controller (polarization control module) 113 coupled to control electrically-addressed polarization controllers 106, which may be placed, for example, between the splitters 105 and the EO phase modulators 107. The polarization controller 113 may receive feedback, e.g., in the form of signals from photodetectors 110, which may be controllers 106. In particular, the feedback may be in the form of direct-current (DC) components detected in the outputs of the photodetectors 110.

It is noted that, while the discussion in the immediately-preceding paragraph focuses on an embodiment using EO phase modulators, the same applies to other phase shifting schemes and/or embodiments using true time delay lines.

Figure 3A:
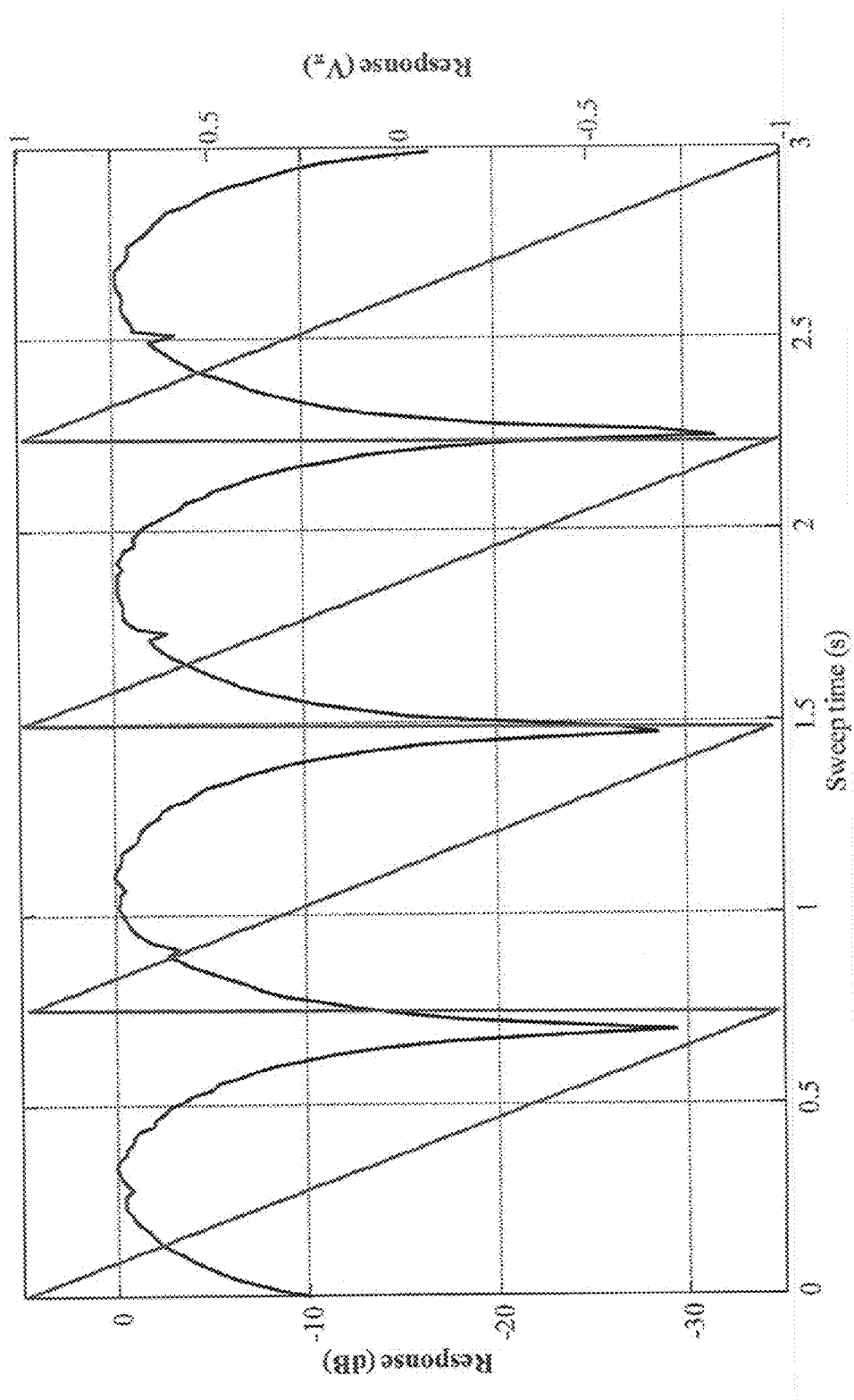
FIGS. 3a and 3b show examples of experimental results obtained using a particular sample implementation of an embodiment of the invention.
Figure 3B:
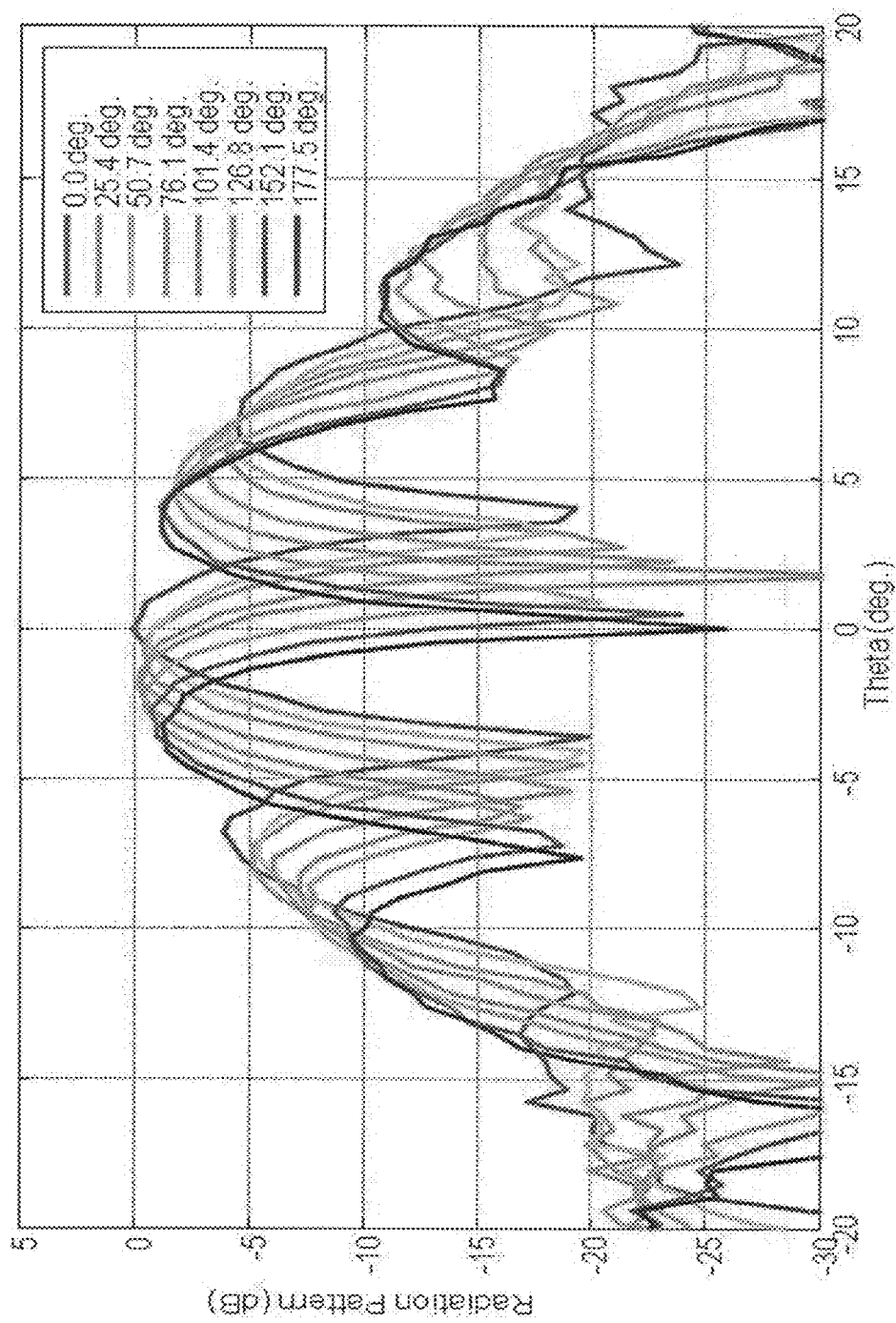

In an example implementation, the inventors have implemented a 1×2 optically addressed phased, array. To demonstrate phase sweeping, a saw-tooth waveform with a period of 1 second and a magnitude of 7 volts ($2V_\pi$) was used to drive the phase modulation. A repeatable and steady RF response was observed, as shown in FIG. 3a. With balanced RF power transmitted, from both antennas, a maximum 30 dB extinction ratio was obtained between in-phase mid out-of phase feeding. In addition, angular radiation patterns of the far field were measured with a varied, applied voltage ranging from 2.1 to 9.5 volts as shown in FIG. 3b. The equivalent phase shifts, determined by the applied voltages, indicated a continuous scanning of the main beam from 0° to 3°, which may have been limited by grating lobes due to a large antenna spacing; this may be improved, e.g., by careful design of the antenna array.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

What is claimed is:

1. An optical feed network comprising:
a polarization combiner configured to receive two optical signals and to provide a combined output;
a splitter unit coupled to the polarization combiner to receive the combined output and configured to split the combined output into an integer number of channel signals;
a plurality of electro-optical phase shifting elements configured to phase modulate the channel signals to produce phase-shifted signals;
polarization controllers disposed prior to the plurality of electro-optical phase shifting elements and configured to control phases of the channel signals;
a polarization control module configured to receive and process one or more signals associated with one or more outputs of the electro-optical phase-shifting elements and configured to provide electrical control signals to one or more of the polarization controllers; and
a plurality of photo-detectors configured to obtain the one or more signals associated with the one or more outputs of the electro-optical phase shifting elements, wherein the one or more signals associated with the one or more outputs of the electro-optical phase shifting elements comprise direct-current (DC) signals detected by the plurality of photodetectors, and wherein the plurality of photodetectors are further configured to provide a plurality of radio frequency (RF) feed signals to an array of a respective plurality of antennas.

2. An optical feed network comprising:
a polarization combiner configured to receive two optical signals and to provide a combined output;
a splitter unit coupled to the polarization combiner to receive the combined output and configured to split the combined output into an integer number of channel signals;
a plurality of electro-optical phase shifting elements configured to phase modulate the channel signals to produce phase-shifted signals; and
two mutually coherent optical sources configured to generate the two optical signals, wherein the two optical signals have a frequency difference directly proportional to a desired RF frequency.

3. The optical feed network of claim 2, wherein the splitter unit comprises multiple splitters.

4. The optical feed network of claim 3, wherein the multiple splitters include at least one 1-to-2 beam splitter and at least one 1-to-N beam splitter.

5. The optical feed network of claim 2, further comprising at least one polarization maintaining fiber configured to couple the polarization combiner to the splitter unit.

6. The optical feed network of claim 5, wherein the at least one polarization maintaining fiber is configured to conduct a component of the combined output corresponding to a first one of the two optical signals along a fast axis and a component of the combined output corresponding to a second one of the two optical signals along a slow axis.

7. The optical feed network of claim 2, further comprising at least one polarization-independent amplifier configured to amplify the combined output prior to the splitter unit.

8. The optical feed network of claim 2, further comprising a phase controller coupled to the plurality of electro-optical phase shifting elements to control phases of the electro-optical phase shifting elements.

9. The optical feed network of claim 2, further comprising: at least one 45° rotational key coupled to at least one output of the plurality of electro-optical phase shifting elements.

10. The optical feed network of claim 2, further comprising:
a plurality of linear polarizers coupled to respective outputs of the plurality of electro-optical phase shifting elements.

11. The optical feed network of claim 2, wherein the plurality of electro-optical phase shifting elements comprises a plurality of electro-optical phase modulators.

12. The optical feed network of claim 11, wherein the plurality of electro-optical phase shifting elements further comprises a plurality of optically-based true time delay lines.

13. The optical feed network of claim 2, wherein the plurality of electro-optical phase shifting elements comprises a plurality of optically-based true time delay lines.

14. A method of providing an array of radio frequency (RF) feed signals comprising a plurality of RF feed signals, the method comprising:
providing two optical signals having a frequency difference directly proportional to a desired RF frequency;
combining the two optical signals to obtain a combined optical signal;
splitting the combined optical signal to obtain a plurality of channel signals;
phase shifting the plurality of channel signals to obtain an array of phase-shifted signals, wherein the array of phase-shifted signals comprises a plurality of phase-shifted signals;
photodetecting the plurality of phase-shifted signals to obtain the plurality of RF feed signals; and
providing the plurality of RF feed signals to an array of a respective plurality of antennas.

15. The method of claim 14, further comprising amplifying the combined optical signal prior to said splitting.

16. The method of claim 14, further comprising controlling polarizations of the plurality of channel signals prior to said phase shifting.

17. The method of claim 16, wherein said controlling comprises obtaining and processing feedback signals from the plurality of RF feed signals to provide polarization control signals for controlling the polarizations of the plurality of channel signals.

18. The method of claim 14, further comprising:
projecting outputs of said phase shifting onto fast and slow axes using at least one 45° rotational key; and
performing linear polarization on outputs of the at least one 45° rotational key.

19. The method of claim 14, further comprising conducting respective components of the combined optical signal, obtained by the combining the two optical signals, along fast and slow axes of a polarization maintaining fiber, wherein the respective components of the combined optical signal correspond to a first of the two optical signals and a second of the two optical signals, respectively.

20. A method of providing an array of radio frequency (RF) feed signals comprising a plurality of RF feed signals, the method comprising:
generating two optical signals using mutually coherent optical sources, wherein the two optical signals have a frequency difference directly proportional to a desired RF frequency;
combining the two optical signals to obtain a combined optical signal;
splitting the combined optical signal to obtain a plurality of channel signals;
phase shifting the plurality of channel signals to obtain an array of phase-shifted signals, wherein the array of phase-shifted signals comprises a plurality of phase-shifted signals; and
photodetecting the plurality of phase-shifted signals to obtain the plurality of RF feed signals.

* * * * *